(12) United States Patent
Schoedl et al.

(10) Patent No.: US 10,331,761 B2
(45) Date of Patent: Jun. 25, 2019

(54) METHOD, COMPUTER READABLE STORAGE MEDIUM AND COMPUTER SYSTEM FOR EFFICIENT AGENDA DRAFTING, SYNCHRONIZATION AND DISPLAY

(75) Inventors: Arno Schoedl, Berlin (DE); Volker Christian Schoech, Berlin (DE); Markus Oliver Hannebauer, Berlin (DE)

(73) Assignee: THINK-CELL SOFTWARE GMBH, Berlin (DE)

( * ) Notice: Subject to any disclaimer, the term of this patent is extended or adjusted under 35 U.S.C. 154(b) by 1028 days.

(21) Appl. No.: 12/698,365

(22) Filed: Feb. 2, 2010

(65) Prior Publication Data

US 2011/0191672 A1    Aug. 4, 2011

(51) Int. Cl.
    *G06F 17/21*          (2006.01)
    *G06F 17/00*          (2019.01)

(52) U.S. Cl.
    CPC ............. *G06F 17/00* (2013.01); *G06F 17/21* (2013.01)

(58) Field of Classification Search
    CPC .............................. G06F 17/21; G06F 17/211
    USPC ................... 715/256, 273, 203, 751
    See application file for complete search history.

(56) References Cited

U.S. PATENT DOCUMENTS

| | | | |
|---|---|---|---|
| 6,002,867 A * | 12/1999 | Jazdzewski | G06F 8/34 717/105 |
| 7,130,848 B2 * | 10/2006 | Oosta | 707/999.01 |
| 7,392,475 B1 * | 6/2008 | Leban | G06F 17/241 715/255 |
| 2002/0109712 A1 * | 8/2002 | Yacovone | G06F 17/3002 715/732 |
| 2003/0122863 A1 * | 7/2003 | Dieberger et al. | 345/730 |
| 2004/0001106 A1 * | 1/2004 | Deutscher et al. | 345/838 |
| 2004/0216032 A1 * | 10/2004 | Amitay et al. | 715/500 |
| 2005/0154995 A1 * | 7/2005 | Miller | G06F 17/2241 715/772 |
| 2005/0223314 A1 * | 10/2005 | Varadarajan et al. | 715/512 |
| 2007/0033154 A1 * | 2/2007 | Trainum | G06F 17/30011 |
| 2007/0198930 A1 * | 8/2007 | Chu et al. | 715/713 |
| 2008/0263101 A1 * | 10/2008 | Hara | G06F 17/2247 |
| 2009/0222741 A1 * | 9/2009 | Shaw | G06Q 10/109 715/753 |

* cited by examiner

*Primary Examiner* — Stephen S Hong
*Assistant Examiner* — Nicholas Hasty
(74) *Attorney, Agent, or Firm* — Harness, Dickey & Pierce, P.L.C.

(57) ABSTRACT

The present invention relates to a method for efficient agenda drafting, synchronization and display comprising:
    displaying visual document elements of an electronic document, the elements comprising one or multiple agendas and topic boxes,
    introducing a user command via an interface, the user command comprising the insertion or deletion of agendas, overviews and topic boxes or the editing of topic boxes,
    automatically propagating all changes introduced by the user to any of the visual document elements of the same document section, the automated propagation of changes synchronizing all agendas, overviews and topic boxes,
    displaying the synchronized visual document elements.

32 Claims, 9 Drawing Sheets

METHOD, COMPUTER READABLE STORAGE MEDIUM AND COMPUTER SYSTEM FOR EFFICIENT AGENDA DRAFTING, SYNCHRONIZATION AND DISPLAY

FIELD OF THE INVENTION

The present invention relates to the field of data processing, and more particularly to efficient drafting and automatic synchronization of agendas in electronic documents.

BACKGROUND AND RELATED ART

The term 'agenda' usually refers to a list of meeting activities in the order in which they are taken up in the course of a meeting. In the context of a presentation, e.g. a PowerPoint presentation, the term agenda refers to one or more visual document elements of the presentation, the elements illustrating the structure of the talk. An agenda displays the subjects discussed in a talk, in the following referred to as topics.

The table of contents of a book written with the help of an electronic text processing program, e.g. Microsoft Word, shares some aspects with an agenda of a presentation. The table of contents of a text document usually includes chapter headers or other first-level headers and may include also second-level or even third-level headers depending on the length of the work. The table of contents of a book as well as an agenda of a presentation fulfill the purpose of giving the reader or auditor an overview of the main topics to be mentioned in a book or a presentation. The table of contents of a text document can therefore be regarded as one particular embodiment of an agenda. The table of contents of a book as well as an agenda of a presentation depict the basic structure of a text or a presentation. In presentations, however, the use of multiple agendas is common: at the beginning of each new topic in the talk, a complete agenda is shown displaying the current topic in a way attracting the attention of the audience.

The term 'current topic' denotes the topic the speaker will discuss in the next slide or slides of a presentation. For books, said term refers to the topic to be discussed in the current book chapter. All topics already discussed and the topics still to be discussed in the following chapters may be displayed in the agendas in addition to their 'current topics'. However, those topics are usually formatted differently than the 'current topic'.

The purpose of using one agenda per topic is to provide the audience with additional information on the structure of the presentation. A reader of a book has the option to have a look at the table of contents whenever he has lost the thread, but the audience of a presentation does not have this option. Ideally, the audience is provided with the information what topic is talked about at the moment (the current topic), but also, which topics have already been discussed and which topics are still to be discussed in the remaining part of the talk.

Microsoft PowerPoint has become the de-facto standard for the generation of presentations while Microsoft Word and various LaTeX derivatives are commonly used for the processing of text documents. Said presentation and text processing programs are ubiquitously used in a multitude of business fields. Despite their ubiquitous usage, said programs show considerable limitations regarding their applicability for creating and editing the table of contents and, in particular, agendas, efficiently.

Technologies being able to speed up the process of drafting presentations and creating text documents are urgently required, as the application of those technologies helps to save valuable working time.

LaTeX derivatives require multiple processing steps (edit, compile, view) in order to propagate changes introduced in the header of a chapter to the table of contents of the document. Microsoft Word is capable of executing this propagation and of updating the table of contents after an explicit request of the user. The propagation of changes introduced to the table of contents to the chapter headers within the text document is not possible at all, neither in LaTeX nor in Microsoft Word. The current document processing programs therefore lack a convenient way to edit a header of a chapter either in the header line or in the table of contents. Currently, in order to edit a particular header, the user has to scroll to the respective header line, edit the header and submit an update or recompilation request in order to update the table of contents. These additional steps require a considerable amount of time and effort.

In Microsoft PowerPoint, the automated generation of overviews or agendas is not possible at all, although agendas are of particular importance for presentations as they serve as guidelines for the audience during the talk.

Currently, agendas are created and synchronized in PowerPoint and other presentation programs manually by the user, an approach that is highly inefficient, error prone and time consuming. Whenever one topic of an agenda has to be changed, e.g. after the detection of a typing error, the changes have to be introduced to all other agendas within a presentation by browsing to all slides containing an agenda and introducing the changes again. If some topics and their associated slides have been reordered within the presentation, currently these changes also have to be manually introduced in all agendas. If a presentation contains multiple, complex agendas which are not synchronized automatically, the multitude of manual update steps required will more or less inevitably lead to inconsistencies between different agendas in a presentation.

The Visual Communication Toolkit developed by the Steercom® GmbH facilitates some aspects of agenda creation but still the agendas created with the help of this toolkit lack the feature of an automated propagation of changes introduced by a user. Said toolkit is implemented as a PowerPoint plug-in and provides a dialog window prompting the user to create or edit topics and to order the specified topics according to a topic hierarchy. Upon confirmation by the user, pages corresponding to the created topics are created. In case existing topics were edited, the corresponding pages are updated. The agenda pages created by said toolkit appear to the user as regular PowerPoint slides comprising usual PowerPoint shapes. While the user is further editing the document in PowerPoint, there are many operations that will break the consistency of agenda pages created this way: Pasting, duplicating or removing agenda pages, reordering pages, reordering topics on a page, or changing some topic text. Some of these inconsistencies can be resolved by explicit use of the means provided by said toolkit. However, the toolkit forcibly restores a consistent set of agendas, discarding most of the changes the user has made in PowerPoint. For instance, agenda pages that have been removed are recreated, and agenda pages that have been added are not incorporated into the existing set of agendas.

In summary, the agenda drafting process used in current presentation software is highly inefficient and error prone. The means provided by current text processing programs for synchronizing the headers of a document with its table of contents are also very limited. The described problems are of predominant importance for presentation software, because presentations, other than text documents, often comprise multiple agendas which are particularly difficult to synchronize manually.

SUMMARY OF THE INVENTION

In accordance with an embodiment of the present invention, there is provided an efficient method for drafting, synchronizing and displaying agendas in electronic documents. Electronic documents are data objects interpretable by a computer. The provided method is of particular advantage for drafting agendas in presentations. The method is efficient, as any change introduced to any agenda of the document is automatically propagated to all other agendas within the document. In case a document comprises multiple document sections, the changes are propagated to all other agendas within the same document section (for a definition of the term 'document section', see page 9). This propagation of changes is executed irrespective of the question to which agenda the changes have been originally introduced. As a result of this automated propagation of changes, all agendas within a document are synchronized.

In the following, the term agenda refers to a visual document element of the visual representation (displayed document) of an electronic document. Each agenda is displayed on a screen and displays a list of one or multiple topic texts. A 'topic text' is a text representing a topic. While an agenda is operable to highlight one of its displayed topic texts, an overview is a visual document element similar to an agenda which, however, does not highlight one particular topic text. The term highlighting in this case denominates the displaying and formatting of a topic text according to a particular design. The particular design is, according to preferred embodiments of the invention, adapted to draw the attention of the user to the highlighted text. An overview provides information on all existing topics within a document but does not highlight one particular topic text. In case a document comprises multiple document sections, an overview provides information on all existing topics within the document section the overview is located in.

The invention, according to a preferred embodiment, comprises the display of one or multiple agendas per document section and may in addition comprise the display of one or multiple overviews per document section. Each agenda or overview displays an ordered list of topics. Each topic displayed in an agenda is represented by a sequence of characters, the 'topic text'. A topic text typically corresponds to a header within a presentation or a book. A scientific presentation, for example, could comprise the topics 'Introduction', 'Methods', 'Results', 'Summary' and 'Conclusion'. For simplification, it is in the following assumed that each character sequence representing a topic, e.g. 'Introduction', is unique within a document section and adapted to distinguish each topic from other topics. According to a preferred embodiment of the invention, however, the uniqueness of the topic text representing each topic is not a requirement. According to preferred embodiments of the invention as depicted in FIGS. 3-7, the existence of multiple distinct topics within a displayed document or document section being represented by identical character sequences is also possible. For example, two distinct topics could both be represented by the same character sequence 'Introduction'. For clarity reasons, and due to the fact that in most cases each topic will be associated with a unique, characteristic topic text, the description of the visual representation according to preferred embodiments of the invention will assume each character sequence representing a topic as being unique within the electronic document. This is, however, not a requirement of the present invention, the invention does also support the drafting of agendas displaying multiple topics with ambiguous (not unique) topic texts.

Each agenda comprises at least one 'topic box'. Topic boxes are visual document elements and placeholders presenting topics to the user. Each agenda (and each overview, if the presentation comprises any) comprises as many topic boxes as topics exist in a section of a document or presentation, and each of the topic boxes of an agenda and the overview displays a different topic. The order of the topic texts displayed in the topic boxes is the same in all agendas and overviews within the same document section. For each topic, exactly one agenda exists within the document section displaying the topic text of the very topic in a 'current topic box', the 'current topic box' being a topic box with a particular design.

In accordance with a preferred embodiment of the invention, the particular design of a current topic box is suited to draw the attention of the audience or reader to its displayed topic text. The design may comprise e.g. the highlighting of the topic text by using bright topic box background colors or by using large font sizes. Typically, the topic texts displayed in topic boxes not being a current topic box are formatted according to a de-emphasized design. A de-emphasized design may comprise, for example, grey font color, small font size, low contrast between font color and background color and the like. The formatting of a topic box according to a de-emphasized design also comprises the case that the topic is not displayed to the user at all.

According to a further embodiment of the invention, the topics of a document section are ordered hierarchically. The design of each topic box of an agenda may depend on the position of the displayed topic within the hierarchy of topics and on the distance of the topic in this hierarchy to the current topic of the agenda. According to said embodiment of the invention, it is possible to selectively hide the topic texts of all topics belonging to a particular hierarchy level, or to hide all topic texts representing topics belonging to a particular hierarchy level which are in addition contained within another branch of the topic hierarchy than the current topic of an agenda (see FIG. 9). The design of topic boxes and agendas can be adjusted in order to uniquely represent a particular company, a project or a person giving the presentation.

Said embodiment of the invention comprises further the option to alter the formatting of particular characters of the topic text displayed in topic boxes of all agendas and overviews by formatting the respective characters in one topic box only. This option is particular beneficial as it allows to set some of the characters in superscript or subscript or to mark a corporate name or person name mentioned in a topic text by using italic fonts. This implies that a user can specifically overwrite some properties of the design determined for each topic box as described in the preceding paragraph for a selected set of characters of a topic text representing a particular topic. If, for example, the third topic of a document section mentions a company name which is set by the user in italic fonts in corresponding topic text displayed in the first agenda of the document section, the changes will automatically be propagated to all topic boxes of the same document section displaying the same topic. As a result, the company name is displayed in italic fonts in all agendas and overviews of the same document section. In summary, the design properties of each topic box may depend on the position of the displayed topic within the topic hierarchy. In addition, some characters of the topic texts may be formatted individually by the user.

In accordance with a preferred embodiment of the present invention, the topic boxes of the agendas and overviews within the same document section are interlinked with each other to enable an automated propagation of changes introduced by a user command to any visual document element of a document section to all other topic boxes, agendas and overviews within the same document section. Those changes comprise the insertion and deletion of topic boxes, agendas and overviews. When a user changes the topic text of a topic displayed in the topic box in one agenda, e.g. transforms 'Summary' to 'SUMMARY', this change is automatically propagated to all other agendas and overviews within the same document section. The number of topics within a document section thereby determines the number of agendas within each document section and the number of topic boxes within each agenda and overview.

According to a further embodiment of the invention, a displayed document or presentation may contain multiple 'document sections', each document section comprising its own set of topics, corresponding agendas and overviews. A 'document section' is a part of a displayed document comprising its own set of synchronized visual document elements. A 'displayed document' is the visual representation of an electronic document which is presented to the user of a presentation or text processing program via a graphical user interface provided by said program.

For example, the first document section of a presentation may comprise the topics 'Introduction', 'Topic 1', 'Topic 2' and 'Summary', while a second document section may function as backup section for answering questions at the end of a talk and may comprise the topics 'Method 1', 'Method 2', 'Statistical Evaluation' and 'Further reading'. According to said embodiment, those two sets of topics act independently from each other, and changes introduced to the 'Topic 1' topic will only be propagated to the agendas, overviews and topic boxes corresponding to the first section of the presentation.

To simplify matters, the following text paragraphs and figures describing embodiments of the invention will refer to documents comprising only one document section and one set of connected and synchronized topics, agendas, overviews and topic boxes. However, it shall be explicitly stated here that other embodiments of the present invention may comprise multiple document sections, wherein each document section comprises its own independent set of connected topics, agendas, overviews and topic boxes.

According to some embodiments of the invention, the document sections defining the sets of connected topics, agendas, overviews and topic boxes are specified by the user via the respective presentation or text processing program.

According to further embodiments of the invention, the document sections being relevant for the sets of connected topics, agendas and topic boxes are determined by the user via a the respective embodiment of the invention, e.g. a plug-in of the presentation program, providing the user with means for efficient agenda drafting and synchronization.

Embodiments of the present invention facilitate and speed up the process of agenda drafting: the user does not have to execute multiple steps as required by LaTeX, or to apply explicit refresh commands as required by Microsoft Word in order to update a table of contents. Embodiments of the invention provide the user with means to edit topic texts within an arbitrary agenda or overview on an arbitrary page of the document. The changes are automatically propagated to all other agendas and overviews of the same document section. The user therefore does not have to scroll to a particular agenda or a particular page. Rather, the user may, for example, insert a new topic box with a new topic into any agenda of the document. As a result, one new topic box displaying the topic text of a new topic is introduced to all other agendas and overviews of the same document section automatically.

Further embodiments of the present invention are particularly advantageous as they support the automatic synchronization of the order of displayed topic texts of the overviews and agendas with the order of topics within a document section. When pages or agendas contained within those pages have been reordered within a displayed document by the user, an update of the order of topic texts within the agendas and overviews is required. According to said embodiment of the invention, the reordering of pages containing one or multiple agendas and the reordering of agendas within a document section results in an automatic reordering of all topic texts within all agendas and overviews if the reordering of pages was associated with a change in the order of agendas within the document section.

One additional benefit according to a further embodiment of the invention is the possibility to seamlessly integrate agendas from existing pages from the same document or a different document of the same type by inserting pages or slides into an electronic document or presentation. The inserted pages can comprise one or multiple agendas. The inserted pages are derived from a 'source document' and inserted to a 'destination document'. The source document and the destination document may be in fact the same document or two distinct documents of the same document type. The page insertion process can be accomplished via the clip board functionality or the import functionality or via any other means provided by the used text processing or presentation program to integrate pages from documents of the same type. After an existing page containing, for example, one agenda, has been copied or otherwise derived from the source document and has been inserted into the destination document, one additional topic box per destination document agenda is created and added to each destination document agenda. Each added topic box displays that topic which is displayed by the agenda of the inserted page in its current topic box. Each topic box added to any of the existing agendas is added at a particular position relative to existing topic boxes in the list of displayed topic texts. Said particular position corresponds to the position of the inserted agenda in relation to the existing agendas, wherein each existing agenda corresponds to one particular topic (the current topic of each agenda). In addition, all topic boxes of the inserted agenda displaying topics whose corresponding agendas have not been inserted to the destination document together with said inserted agenda are deleted. An agenda 'corresponding' to a topic is an agenda displaying the topic in its current topic box. In addition, new topic boxes are created and added to the topic box list of the inserted agenda. Each topic of the destination document corresponds to one newly created topic box within the inserted agenda. The order of the topic texts displayed in the newly created topic boxes in the inserted agenda corresponds to the order of topics within the same section of the destination document.

In another aspect, the present invention relates to a computer program product for efficient agenda drafting, synchronization and display.

In accordance with a preferred embodiment of the invention, the computer program product is implemented as a so called 'plug-in', also referred to as 'add-in'. The plug-in is interoperable with a presentation program, such as Microsoft PowerPoint or the like.

In other preferred embodiments of the invention, the 'plug-in' is interoperable with a text processing program.

In accordance with further embodiments of the invention, the method for efficient agenda drafting, synchronization and display is implemented as integral part of a presentation program or text processing program.

BRIEF DESCRIPTION OF THE DRAWINGS

In the following, embodiments of the invention are explained in greater detail by way of example, only making reference to the drawings in which.

DETAILED DESCRIPTION

Figure 1:
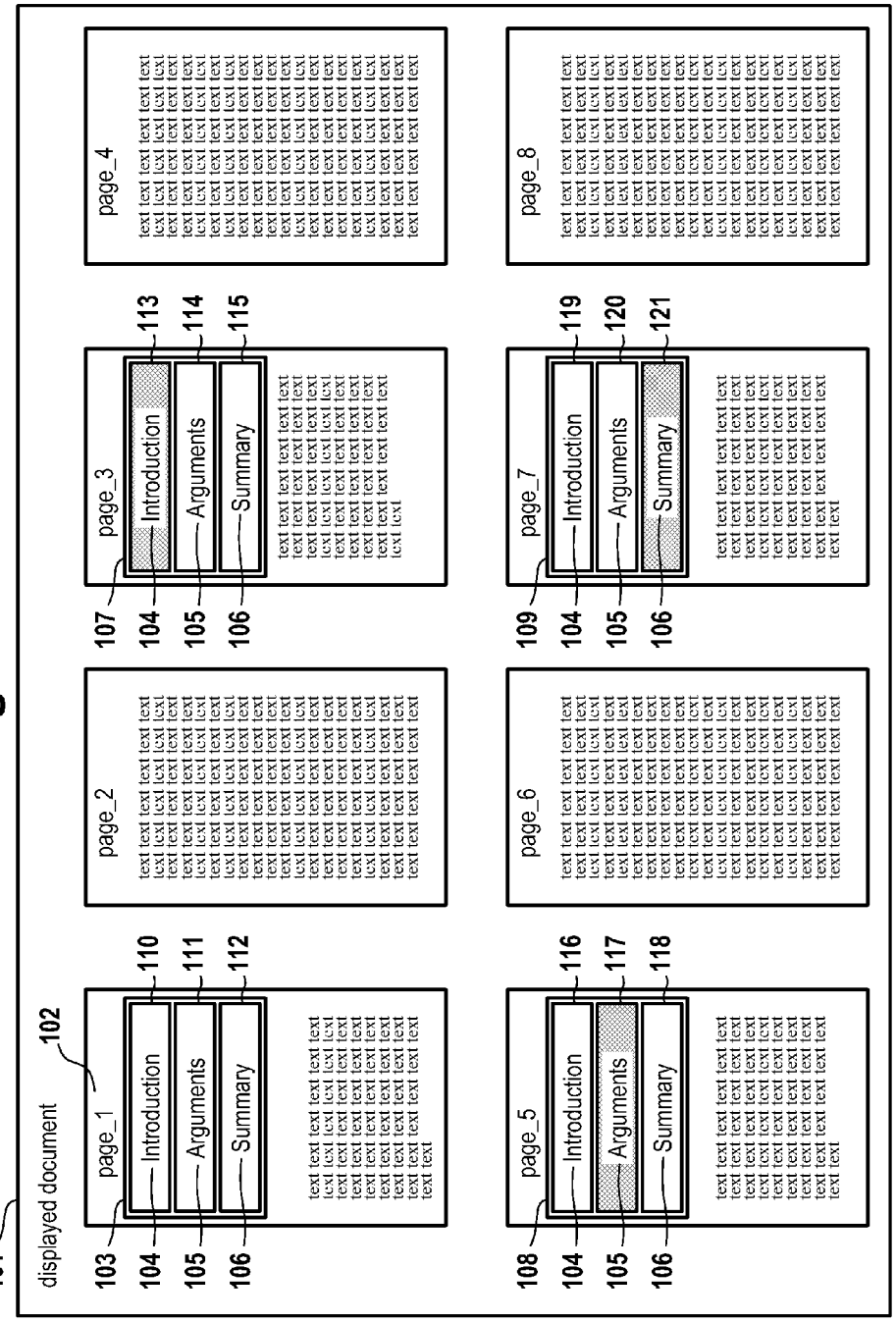
FIG. 1 shows a displayed document comprising one overview and three agendas.

FIG. 1 depicts visual document elements of an electronic document: agendas, overviews and topic boxes. FIGS. 2-4 and 6 provide a combined view of visual document elements and their corresponding data objects according to a preferred embodiment of the invention. FIG. 5 maps user commands to computer implemented methods executable e.g. by a plug-in of a presentation program or a presentation program itself. FIG. 7 focuses solely on the 'refresh agenda objects' method of the preferred embodiment. In order to illustrate the relation of the visual objects to their corresponding data objects according to a preferred embodiment of the invention, a mapping of those two concepts is depicted in table 1. To simplify matters, the visual document elements described in table 1 are contained in a document comprising only one single document section.

TABLE 1

| Visual document element | Data object |
|---|---|
| Displayed document:<br>A visual representation of an electronic document. | Document object:<br>An implementation of the electronic document in the form of a document object. |
| Agenda:<br>a visual object displaying a list of topics to be presented in a text document or in a presentation. Each agenda comprises one or multiple topic boxes and one current topic box being marked by a particular design.<br>The number of agendas is equal to the number of topics in the document. | Agenda object:<br>a data object comprising a list of item objects, one of these item objects being referenced by the itemOwn attribute of the agenda object. |
| Overview:<br>an agenda lacking a current topic box | Agenda object:<br>an agenda object whose itemOwn attribute is NULL. |
| Topic box:<br>a visual placeholder within an agenda or overview for displaying a topic.<br>Topic boxes of different agendas being located at the same place within the topic lists of the agendas display the same topic. For example, all topic boxes on the third place of the topic list of all agendas may display the topic 'Summary'. The order of topics within each of the agendas is synchronized according to a further embodiment of the invention with the order of current topics of the agendas within a document. For example, the third topic 'Summary' within each agenda | Item object:<br>a data object comprising a textbox and two attributes agendaSource and agendaContainer.<br>Editing the textbox of one item object results in the itemCopyFrom attribute of one particular agenda object pointing to the edited item object. Said agenda object is determined by the agendaSource attribute of the edited item object. The 'refresh agenda objects' method propagates the changes introduced to the edited item object to all other item objects of the document whose agendaSource attribute also point to said agenda object (for details regarding the interlinking of item objects and agenda objects by attribute pointers |

TABLE 1-continued

| Visual document element | Data object |
| --- | --- |
| corresponds to the third agenda in the document, the third agenda displaying the 'Summary' topic as current topic in its current topic box. | and the propagation of changes via these pointers see FIGS. 3, 4, 6 and 7). |
| Current topic box of an agenda: topic box marked by a particular design and displaying the current topic. | An item object referenced by the agenda object the item object is contained in via the itemOwn attribute of said agenda object. |
| Topic: a concept or subject of a talk, e.g. 'Introduction' or 'Summary'. Each topic or, to be more precise, a text representing said topic, the topic text, is displayed in one topic box or current topic box in each agenda and each overview of a document. Strictly speaking, the expression "an agenda/overview/topic box displays a topic" means that the agenda/overview/topic box displays a piece of text, the topic text, that represents a topic. | Implicit implementation: the textboxes of all item objects having the same agendaSource attribute are synchronized with each other via the 'refresh agenda objects' method and display, after synchronization, the same topic (for details, see FIGS. 6 and 7). |

FIG. 1 shows a displayed document 101 comprising several pages, one overview 103 and three agendas 107, 108, 109 according to one embodiment of the invention, the agendas and the overview showing the topics 'Introduction' 104, 'Arguments' 105 and 'Summary' 106. Document 101 comprises only one document section. The displayed document can be a text document or a presentation. In a preferred embodiment of the invention, document 101 refers to the visual representation of a Microsoft PowerPoint presentation and the pages correspond to slides. Each agenda and each overview contains as many topic boxes as topics exist within the document. The order of the topic texts displayed in each topic box of the agendas and overviews corresponds to the order of topic texts highlighted in the current topic box of the agendas in the displayed document. For each topic within the document, there exists exactly one agenda displaying the topic text of said topic in its current topic box. While the term 'topic' refers to the main concepts and subjects of a document, topic boxes are visual document elements each displaying, e.g. on a screen, the topic text of one topic. In every agenda, there is always exactly one topic box, the current topic box 113, 117, 121, marked by a particular design. According to a preferred embodiment of the invention, the particular design of the current topic box is adapted to draw the attention of the viewer to its content. Agendas, overviews and topic boxes, including 'current topic boxes', will in the following be referred to as 'visual document elements'. Visual document elements are visual document elements displayed to a user of the text processing or presentation program via a graphical user interface.

At the beginning of the presentation, the speaker shows an overview 103 containing topic texts of all topics 104, 105, 106 that will be discussed in the talk. During the presentation, each new topic is introduced with a slide containing one agenda, the agenda highlighting in its current topic box the topic to be discussed in the next slides. The topic 'Introduction' 104 is discussed in the presentation on page/slide number 3 and 4. Agenda 107 on page 3 displays the topic 'Introduction' in its current topic box 113. While topic boxes 114 and 115 of agenda 107 have a de-emphasized design, the current topic box 113 of agenda 107 has a particular design adapted to draw the attention of the audience to the topic 'Introduction' 104. Current topic box 117 of agenda_2 108 highlights the topic 'Arguments' 105 and current topic box 121 of agenda_3 109 highlights the topic 'Summary' 106. Overviews, e.g. overview_1 103, do not have a current topic box to highlight the topic text of one particular topic. Each topic of a document corresponds to one agenda in which its topic text is highlighted within the current topic box. In addition, there may be one or multiple overviews per document, e.g. overview_1 103, the overviews lacking a current topic box.

Figure 2:
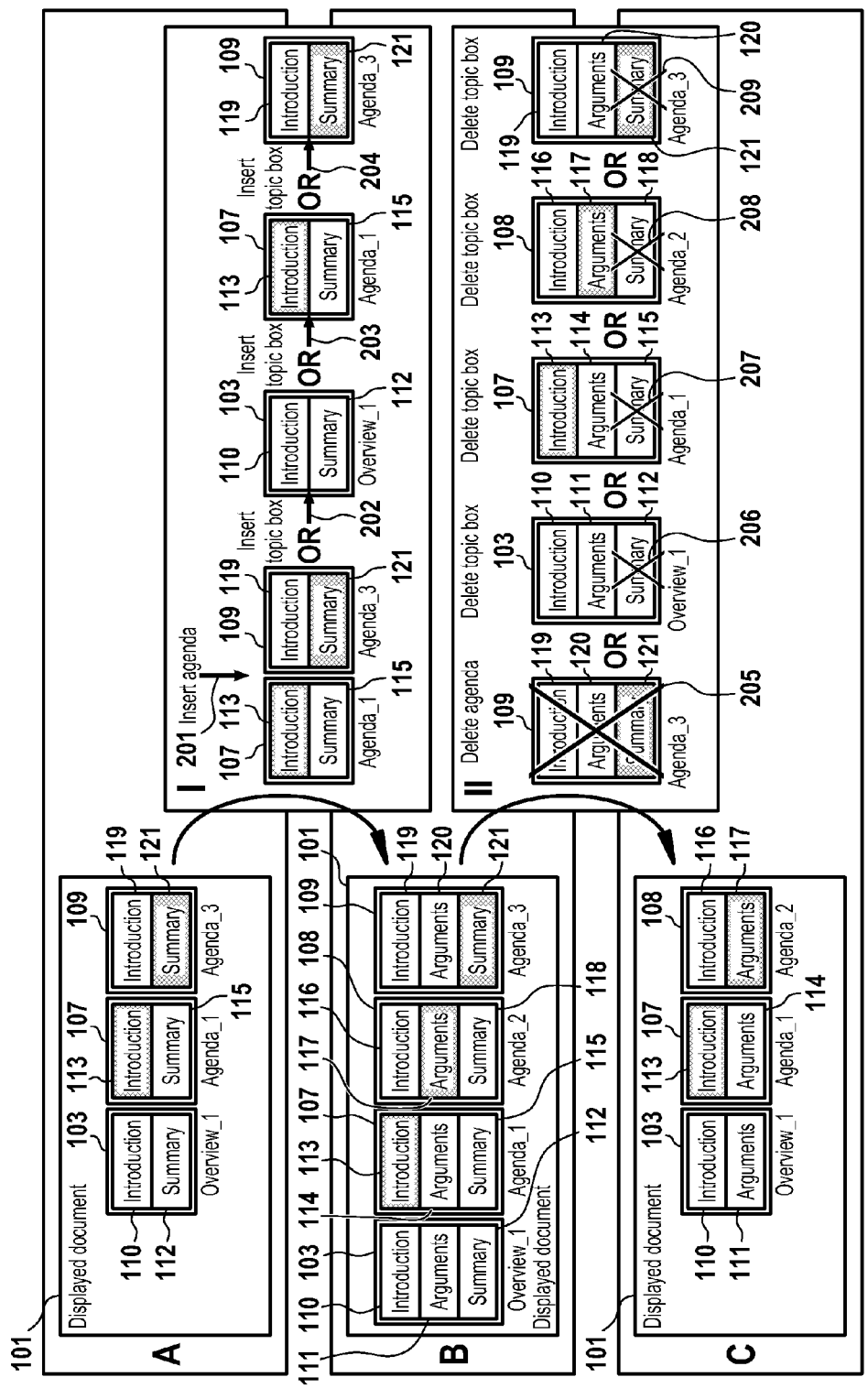
FIG. 2 illustrates the effects of inserting or deleting agendas or topic boxes on the visual document elements of a displayed document.

All the visual document elements depicted in FIG. 1 are implemented in such a way that changes introduced to one particular topic box or one particular agenda are automatically propagated to all other agendas, overviews and topic boxes (see FIG. 2).

FIG. 2 illustrates the automatic propagation of changes introduced to a visual document element to all other visual document elements according to a further embodiment of the invention. It depicts three states A, B and C of a displayed document and two sets of equivalent user actions I) and II) resulting in a transition from one document state to another. The equivalent, alternatively executed user actions depicted in I) cause a transition of displayed document 101 from state A to state B. The second set of equivalent user actions depicted in II) cause a transition of the displayed document 101 from state B to C. All user actions depicted within one set I) or II) yield the same document state (B or C, respectively).

Equivalent user actions depicted in set I) comprise the insertion 201 of an additional agenda in the document between agenda_1 and agenda_3 and the insertion 202, 203, 204 of an additional topic box between the topic boxes showing the 'Introduction' topic and the 'Summary' topic into any of the agendas or in the overview. All these equivalent user actions 201-204 result in the same document status B. This means, that a user who wants to insert an agenda between agenda_1 and agenda_3 does not have to scroll to a particular page within a document between said two agendas. Rather, he may insert an additional topic box in any of the agendas or overviews of the document, e.g. overview_1 103, agenda_1 107 or agenda_3 109. After the new topic box has been added by the user e.g. to agenda_3, all other agendas and overviews are updated and as a result do also comprise an additional topic box. In addition, one further agenda object (agenda_2 108) has been created. The order of the topic texts shown in each agenda or overview corresponds to the order of topic texts highlighted in the current topic box of the agendas in the displayed document and corresponds to the order of topics within the document. Alternatively, the user may create 201 a new agenda 108 between agenda_1 and agenda_3. The new agenda comes with a current topic box highlighting the topic text of a new topic which is to be specified by the user. As a result of the creation of said new agenda, one new topic box is added to each agenda in the document between the topic boxes displaying the topics 'Introduction' and 'Summary'.

Analogously, the deletion 205 of agenda_3 as depicted in FIG. 2 II) is functionally equivalent to the deletion 206-209 of the topic box displaying the 'Summary' topic in any of the agendas or the overview. The user may delete 205 agenda_3 or he may delete 207 topic box 115 of agenda_1 in FIG. 2. He may also delete topic box 112 of overview 103, topic box 118 of agenda 108 or topic box 121 of agenda 109. The result, a displayed document according to document state C, is the same: the deletion of agenda_3 and the deletion of all topic boxes in all agendas and overviews of the document displaying the 'Summary' topic. The user can execute the delete topic box command on any agenda or overview within the document, he does not have to scroll to a particular agenda. The delete commands in the embodiment depicted in FIG. 2 are automatically propagated to all other visual document elements. The result of the equivalent deletion steps II), executed on agenda_3 or on any of the topic box elements 112, 115, 118, 121 is depicted in FIG. 2C.

Figure 3:
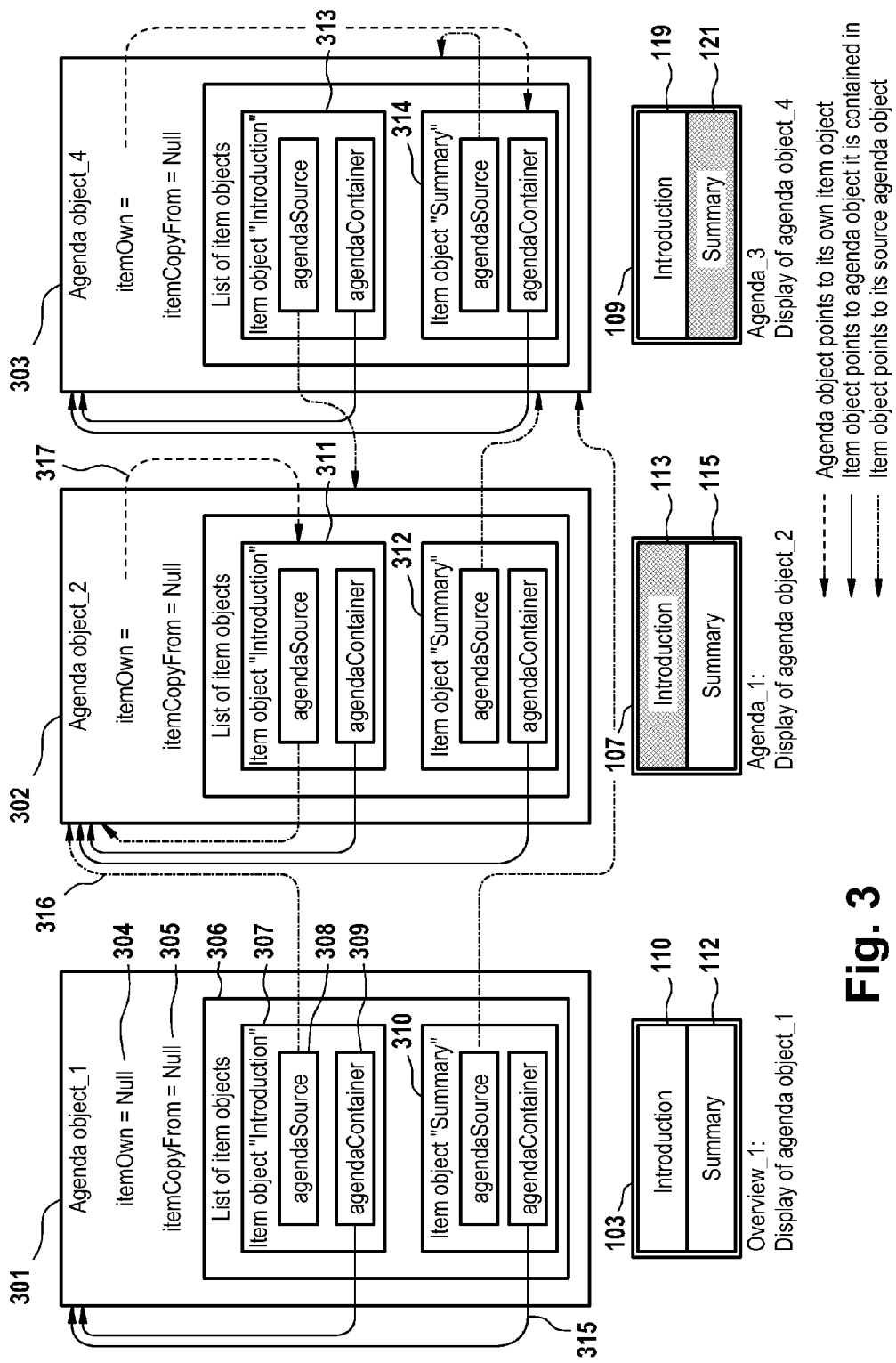
FIG. 3 illustrates the interdependence of the visual document elements depicted in FIG. 1 and data objects according to one preferred embodiment of the invention.

FIG. 3 shows the agenda objects and item objects in the upper part of the figure while their corresponding visual document elements (overview, agendas and topic boxes) are shown below. Object attributes pointing to data objects are depicted in the form of arrows in FIGS. 3 and 4 and do not change over the lifetime of the depicted agenda objects and item objects. While FIGS. 1 and 2 have depicted the functional principles of the preferred embodiment of the invention as they are visible to the user via a graphical display, FIG. 3 depicts data objects corresponding to the visual document elements of a displayed document according to a preferred embodiment of the invention. The visual document elements should not be understood as additional data objects but rather as visual representations of their corresponding data objects (agenda object and item objects) on a graphical display. According to a further embodiment, the methods and data objects required for efficient agenda drafting are executed by a so-called 'plug-in' for the presentation program, e.g. Microsoft PowerPoint, which is able to communicate with the presentation program via an application programming interface (API). According to another embodiment, said methods and data objects are integrated within a presentation or text processing program.

According to further embodiments, each electronic document is represented as a 'document object'. Agendas as well as overviews are both implemented in the form of agenda objects. The topic box elements visible on a screen correspond to item objects. Each document object comprises a list of agenda objects. Each agenda object comprises the attribute 'itemOwn', 'itemCopyFrom' and a list of item objects. Each item object comprises the attributes 'agendaSource' and 'agendaContainer' and a textbox. The textboxes are depicted in FIGS. 2 and 3 in form of the names of the item objects, e.g. 'Summary'. Each item object corresponds to one topic box instance on a screen. Each item object comprises a reference (or pointer), e.g. 315, to the agenda object it is contained in via its attribute agendaContainer.

In addition, each item object comprises a reference to the agenda object it is contained in or to another agenda object via its attribute agendaSource. Multiple item objects may point to the same agenda object via their agendaSource attribute. For example, the agendaSource attributes of the three 'Summary' item objects 310, 312 and 314 all point to the agenda object_4 303, the visual agenda element 109 corresponding to the agenda object_4 data object highlighting the 'Summary' topic within its current topic box.

Figure 6:
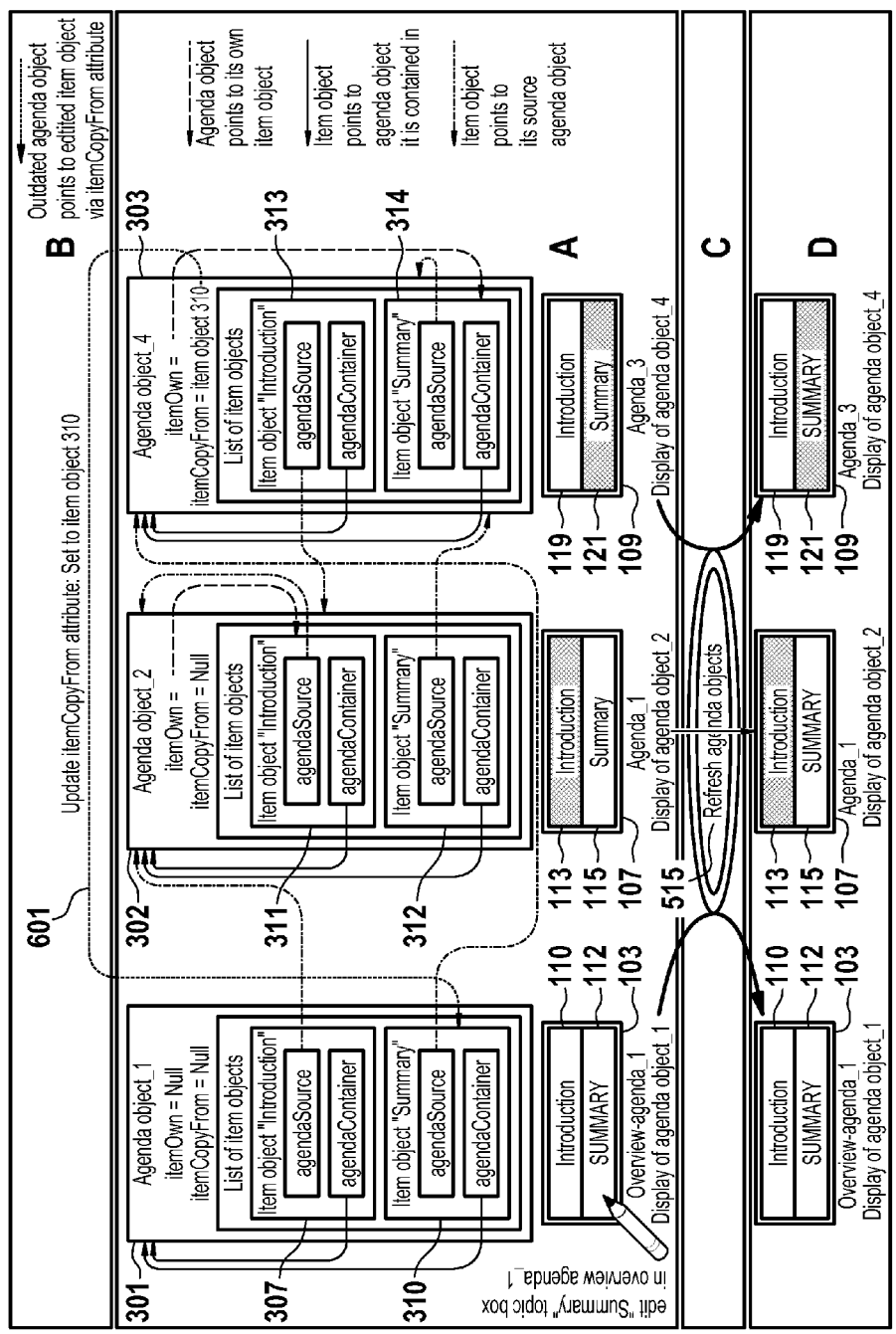
FIG. 6 illustrates the steps of editing one topic box (A), updating the itemCopyFrom attribute of the agendaSource agenda object of the edited item object (B) and propagating the changes to other agendas (C), resulting in updated, synchronized agendas (D)
Figure 7:
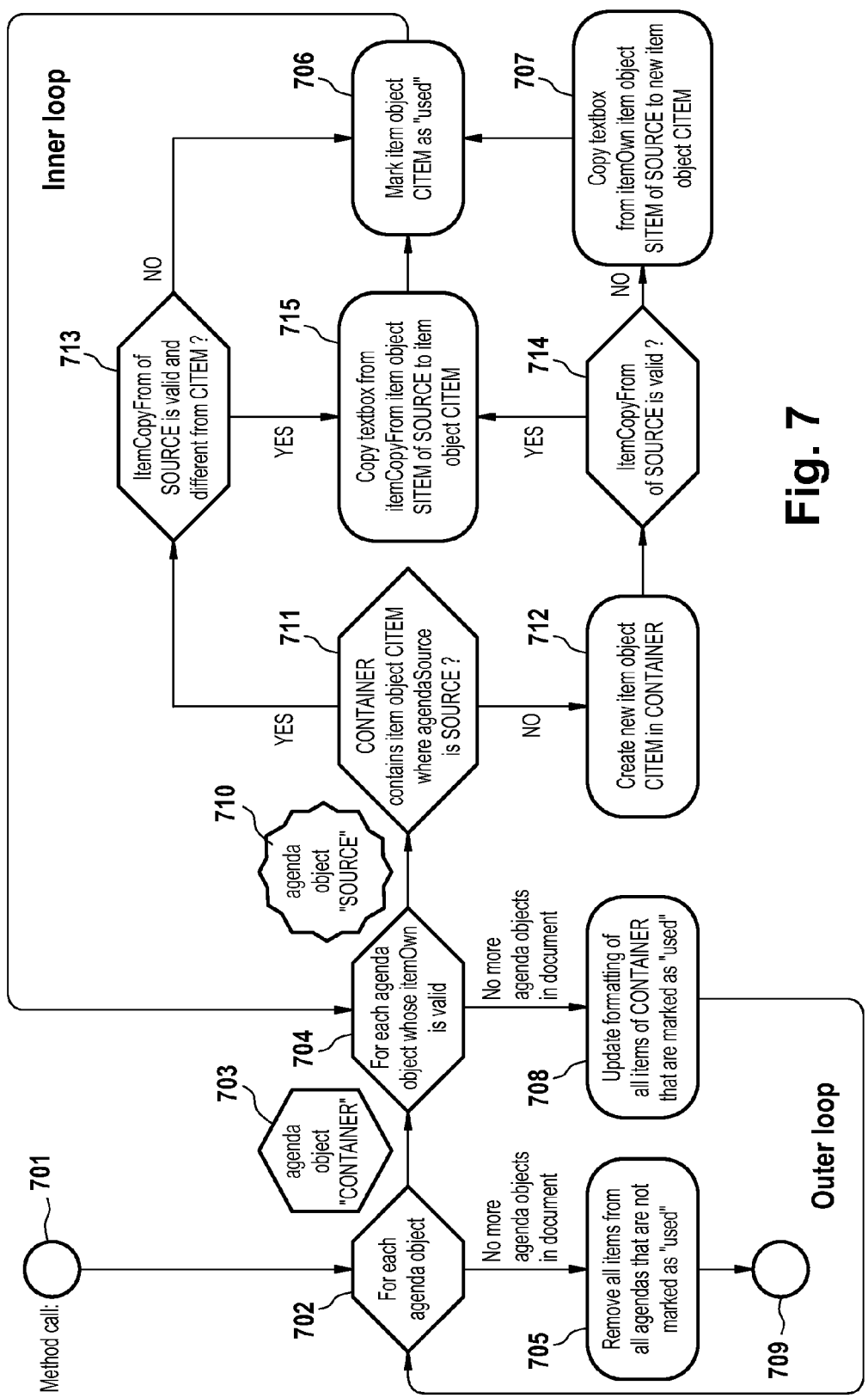
FIG. 7 is a flowchart illustrating the 'refresh agenda objects' method, the method in operation synchronizing all agenda objects.

The itemCopyFrom pointer of an agenda object is used for propagating changes introduced by the user, e.g. by editing the textbox of an item object, during the execution of the 'refresh agenda objects' method as explained in FIGS. 6 and 7.

Each agenda object can access all its item objects via the list of item objects, and may access one particular item object via its itemOwn attribute or its itemCopyFrom attribute.

The itemOwn attribute of each agenda object points to that item object of its item object list that shall be highlighted in the current topic box of the corresponding agenda. The itemOwn attribute of agenda object_4 303 of FIG. 3 pointing to the 'Summary' item object 314 results in the highlighting of the current topic box 121 of agenda_3 109. If the itemOwn attribute of an agenda object is NULL, the corresponding visual document element has no highlighted current topic box. The corresponding visual document element is in this case an overview, not an agenda. No item object in any agenda points via its agendaSource attribute to an agenda object which is an overview.

Figure 4:
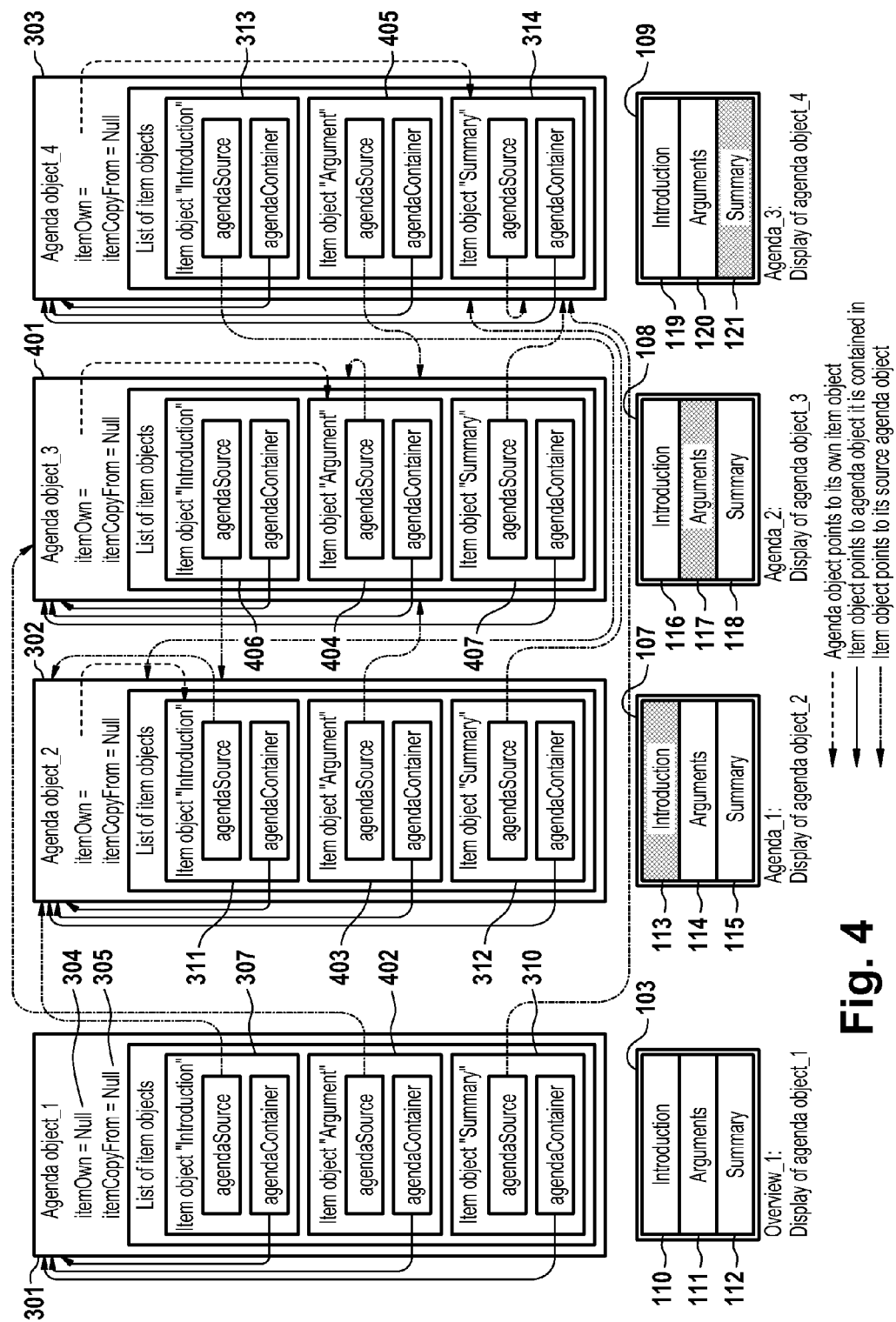
FIG. 4 illustrates the visual document elements and corresponding data objects depicted in FIG. 3 after the insertion of an additional topic box.
Figure 5:
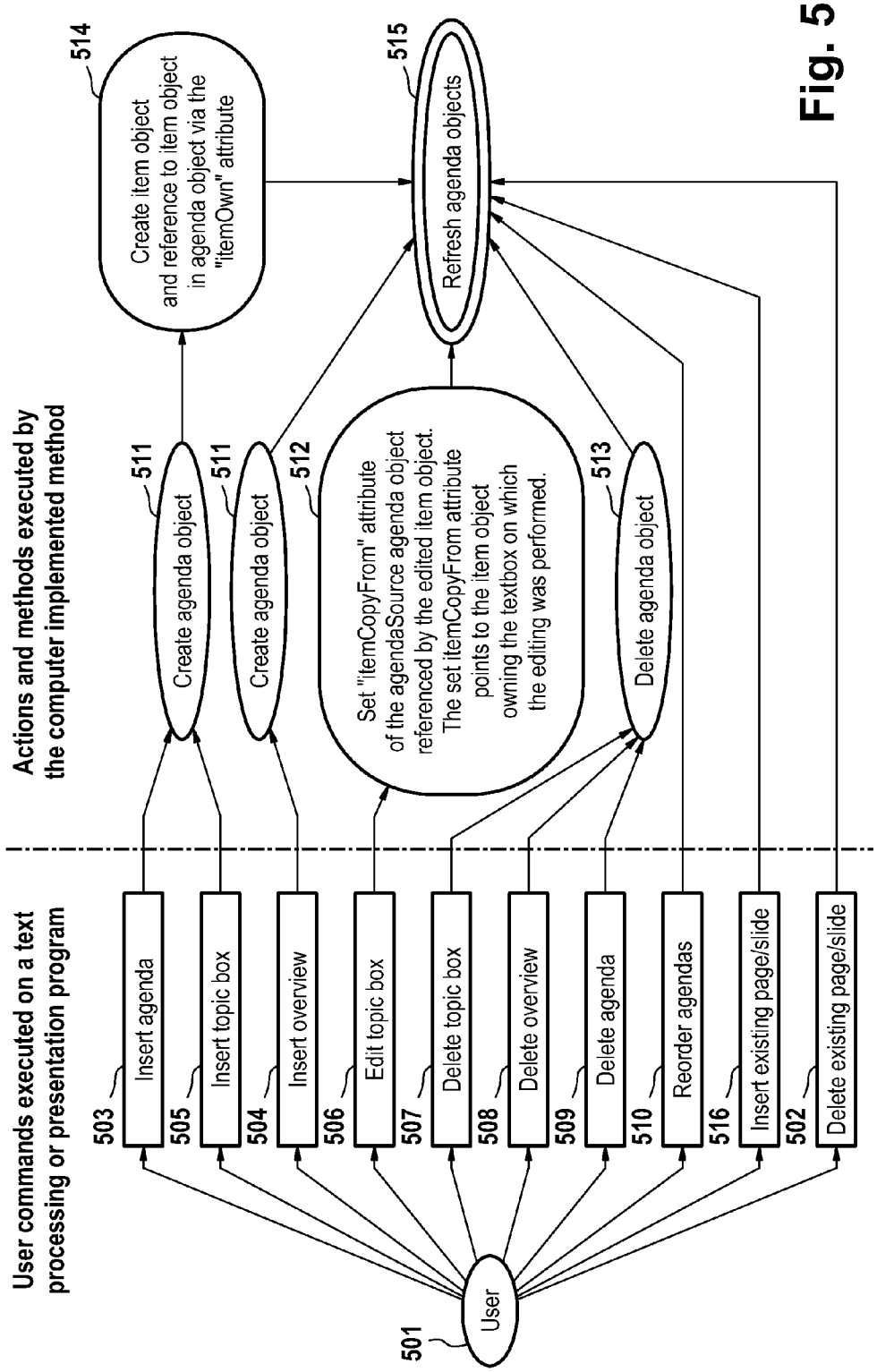
FIG. 5 illustrates user commands executed on agendas, topic boxes and agenda containing pages and the computer implemented methods and actions they initiate.

FIG. 4 shows data objects in combination with their corresponding visual document elements according to the embodiment of the invention depicted in FIG. 3 after the creation of one additional topic box within one agenda or the creation of a new agenda. The additional agenda_2 108 could be the result of the user adding an additional 'Arguments' agenda on a page between the 'Introduction' agenda 107 and the 'Summary' agenda 109 of FIG. 1. It could also be the result of the user adding an additional topic box to the overview_1 103 or agenda_1 107 between the two existing topic boxes displaying the 'Introduction' and 'Summary' topics. As explained in FIG. 2, the final consequences of inserting and deleting topic boxes and agendas are the same. The new agenda object_3 401 comprises two item objects 406, 407 for displaying the 'Introduction' and the 'Summary' topics and in addition comprises an item object 404 for displaying the 'Arguments' topic. The corresponding visual representation 108 of this data object depicted below highlights the 'Arguments' topic in its current topic box. This highlighting is based on the itemOwn attribute of agenda object_3 401 pointing to item object 404 having assigned the text box "Arguments".

In addition, one new item object has been added to all agenda objects, including agenda object_1 corresponding to the overview_1. All these new item objects 402-405 point to the new agenda object_3 401 via their agendaSource attribute, while the agenda Container attribute of each item object 402-405 points to the agenda object each item object is contained in. The agendaSource attribute of each item object points to that very agenda object/agenda displaying the topic text of that topic displayed by the item object in its current topic box.

FIG. 5 shows on its left side possible user commands acting on pages or visual document elements of a displayed document according to a further embodiment of the invention. The computer implemented methods and actions triggered by those commands are depicted on the right side of the figure. According to one embodiment of the invention, the methods and actions are exercised by a plug-in operable to communicate with a presentation program, e.g. Microsoft PowerPoint. According to other embodiments of the invention, the methods are implemented as part of the presentation or text processing program. The insertion 503, 505 and deletion 507, 509 of different visual document elements each result in identical document states as described in FIG. 2. The insertion of a new agenda 503 or a new topic box 505 by a user both trigger the creation 511 of a new agenda object comprising a new item object referenced via the 'itemOwn' object attribute of the new agenda object, the new item object being created in step 514. The insertion 504 of an overview does not initiate the creation 514 of new item objects. Rather, a new agenda object is created 511 empty. Item objects corresponding to the existing topics of the current document section are created for said empty agenda object in the 'refresh agenda objects' method 515. After execution of the 'refresh agenda objects' method 515, the created overview comprises topic boxes which are not highlighted in a current topic box. The itemOwn attribute of the agenda object corresponding to the created overview is NULL. The topic boxes of the new overview solely comprise topic texts representing topics which were already displayed in the one or multiple existing agendas of the document. Correspondingly, if a user deletes 509, 508, 507 an agenda, an overview or a topic box from the document, the results regarding the executed methods and resulting data objects are the same. In case an agenda is deleted according to command 509, the corresponding agenda object is deleted 513 as well (the concept of 'correspondence' between the visual document elements and data objects is illustrated in FIGS. 3 and 4). In case a topic box is deleted 507, the agenda object which the agendaSource attribute of the corresponding deleted item object points to is deleted 513. The deletion 508 of an overview results in the deletion 513 of the corresponding agenda object and the item objects contained in this agenda object.

The 'reorder agendas' command 510 is executed when a user changes the order of the agendas within a document. If the user reorders some of the agendas in a document, the order of topic texts displayed by the agendas does not any more correspond to the order of agendas and their current topics in the document. The order of the current topics of the reordered agendas is, however, propagated automatically after the reordering of agenda objects during the execution of the 'refresh agenda objects' method 515. The execution of the command 510 triggers the reordering of all topic texts displayed in the topic boxes of all agendas and overviews of the document section in which the reordering of agendas was executed, resulting in a synchronization of the order of displayed topics within the agendas and overviews with the order of current topics of the agendas within the same document section. The topic text of the topic displayed in the current topic box of a first agenda of a document section is the first topic to be displayed in all agendas and overviews of the same document section. Command 510 can be applied by the user e.g. by reordering agendas and by reordering pages containing agendas.

The 'refresh agenda objects' method 515 comprises, among others, the function of keeping the order of item objects within the agenda objects synchronized with the order of the current topics of the agendas within the displayed document. In case a user has changed the order of pages, e.g. by moving page_7 and page_8 two pages forward (earlier in the presentation), the agenda highlighting the 'Summary' topic is moved before the agenda highlighting the 'Arguments' topic (FIG. 1). The order of displayed topic texts and corresponding topics in the agendas—'Introduction'—'Arguments'—'Summary'—is, at this moment, outdated and requires to be synchronized with the order of agendas within the document: 'Introduction'—'Summary'—'Arguments'. This synchronization is executed in method 515. In addition, method 515 is responsible for propagating changes introduced for example by editing the content of a topic box 506, which is described in greater detail in FIG. 6.

The insertion 516 of an existing page or slide into a displayed document comprises, for example, actions such as pasting a page containing an agenda from a source document to a destination document. Source document and destination document can be the same document or different documents of the same type. The insertion may also comprise the action of importing one or multiple pages from another document into the destination document, the imported pages containing one or multiple agenda objects. Pasting an existing page into a document may be executed for example via the clipboard functionality of Microsoft Word or PowerPoint. The term 'existing' denotes that the page and the agenda within the page were already defined in the source document from which the page was derived. As a result of step 516 and the subsequent execution of the 'refresh agenda objects' method 515, the destination document does not only comprise the agenda of the inserted existing page but also additional topic boxes. In case one agenda was contained in the inserted page, one additional topic box is added to each existing agenda and each existing overview of the destination document. Each of said additional topic boxes displays the current topic of the inserted agenda. Each of the additional topic boxes is added to the list of existing topic boxes of each agenda at a position that corresponds to the position of the inserted agenda in relation to the existing agendas (and their respective current topics). In case the page of the source document comprising the inserted agenda was inserted between a first existing agenda having "Introduction" as current topic and a second existing agenda having "Arguments" as current topic, then the topic box displaying the new inserted topic will in each existing agenda of the respective document section be located on the second position. The second position is the position in the list of displayed topics between the topic boxes displaying the "Introduction" and the "Arguments" topics. All topic boxes of the agenda of the inserted page corresponding to topics of the source document which were not also inserted to the destination document are deleted from the inserted agenda.

If the user deletes 502 a page containing an agenda, the 'refresh agenda objects' method 515 is executed analogously, leading to a deletion of topic boxes and corresponding item objects displaying the same topic as has been displayed in the current topic box of the agenda on the deleted page.

According to further embodiments of the invention, a reorder signal initiates the 'refresh agenda objects' method. The reorder signal may be a mouse click, a scrolling movement, the absence of any user input for a certain period of time or any other signal, including signals being submitted autonomously and repeatedly by the plug-in or the presentation program after a fixed time period. This reorder signal may be sent to a filter module at first before the signal can initiate the execution of the 'refresh agenda objects' method, the filter module ensuring that the method 515 is executed only in case the order of agendas has changed since the last execution of 515.

In summary, each user command results in the execution of a method or action by the plug-in leading to a change in the set of existing data objects, e.g. by the creation of new agenda objects, the deletion of existing agenda objects or the change of a textbox of an item object after the user has edited one topic box. In order to propagate changes introduced to any agenda, overview or topic box to other visual document elements and corresponding data objects within the document object, the 'refresh agenda objects' method 515 is executed. According to the depicted preferred embodiment of the invention, all actions are executed on the agenda objects. The 'delete agenda' command 509 and the 'delete topic box' command 507, for example, trigger the deletion of an agenda object. In case of the 'delete topic box' command, the agenda object to be deleted by this command is the one agenda object being referred to via the agendaSource attribute of the item object corresponding to the deleted topic box. Other item objects pointing to the deleted agenda object via their agendaSource attribute are deleted later on in the 'refresh agenda objects' method, including the item object corresponding to the topic box the delete command was applied to. If a new topic box is inserted by the user according to command 505, at first a new agenda object is created 511, and in the next step 514 a new item object is created which is referenced by the itemOwn attribute of the new agenda object. All commands of said embodiment of the invention can therefore be considered as agenda object centric, the validity and actuality of the item objects being guaranteed by the 'refresh agenda objects' method.

FIG. 6 shows the process of editing a topic text in one topic box and the resulting changes on the data object level according to the embodiment of the invention depicted in FIG. 3. In FIG. 6A, topic box 112 of overview_1 103 is edited by the user: the topic text 'Summary' is replaced by the upper case character sequence 'SUMMARY'. In step B, as a result, the itemCopyFrom attribute of that agenda object 303 being referenced by the agendaSource attribute of edited item object 310 is set to point 601 to that item object to which the changes have been applied by the user (item object 310). The affected agenda object_4 303 has a 'Summary' item object as itemOwn item object. At this stage, the agenda objects of the document are out of sync, as the edited textbox of item object 310 comprises a different text ('SUMMARY') than the textboxes of item objects 312, 314 of other agenda objects 302, 303 ('Summary'). This inconsistency is resolved in step C by the 'refresh agenda objects' method, which is described in detail in FIG. 7. As a result of step C, the changes introduced to topic box 112/item object 310 are automatically propagated to all other agenda objects and item objects of the document. Step D shows all synchronized agendas and the overview displaying the topic text 'SUMMARY'.

FIG. 7 shows a flowchart illustrating the actions triggered by the call 701 of the 'refresh agenda objects' 515 method according to a further embodiment of the invention. The main purpose of this method is to synchronize all agenda objects within one document by propagating changes introduced to one agenda object or item object to all other agenda objects and item objects. According to a further embodiment of the invention, the propagated changes also comprise changes in the order of topics and corresponding topic texts.

Two nested loops are executed over sorted lists of agenda objects, wherein the sorting of agenda objects corresponds to the order in which the agendas corresponding to the agenda objects appear within the document. This sorting guarantees that the order of the item objects within each agenda object corresponds to the order of agendas and highlighted current topics within the displayed document. The first loop, also referred to as 'outer loop', is executed on all agenda objects and comprises the steps and decisions 702, 704 and 708. The current agenda object on which all actions within the outer loop are performed is referred to as 'CONTAINER' 703. The CONTAINER is that current agenda object for which all item objects are being assembled in steps executed in the inner loop.

The second loop, also referred to as 'inner loop', is executed on all agenda objects of a second list of sorted agenda objects having a valid itemOwn attribute. Agenda objects corresponding to overviews are therefore not part of the list of agenda objects used for the inner loop. A valid attribute in this context means that the attribute is not NULL. The inner loop comprises in any case the steps and decisions 711 and 706. The current agenda object of the agenda object list of the inner loop is referred to as SOURCE 710. The SOURCE is that agenda object whose item objects are evaluated regarding the question if they can be used as source for copying their textboxes to an item object assembled for CONTAINER. Between 711 and 706, multiple steps or decisions are possible depending on the properties of the CONTAINER and SOURCE agenda objects.

At decision 711, the current agenda object from the outer loop, CONTAINER, is examined whether it contains an item object CITEM with its agendaSource attribute referring to the SOURCE agenda object from the inner loop.

Decision Path 711-713:

If the result of the decision 711 is 'yes', no new item object has to be created for CONTAINER. Rather, the CITEM is used for further examination.

Decision Path 711-713-706:

In decision 713, it is examined whether the itemCopyFrom attribute of the SOURCE agenda object is valid (not NULL) and does not point to CITEM.

A NULL value for the itemCopyFrom attribute of SOURCE denotes that the topic text displayed by CITEM has not been changed since the last execution of 515 in any of the item objects displaying the same topic as CITEM. In this case, 713 is answered with 'no', there does not exist a need to update CITEM, and CITEM is marked as 'used' in step 706.

If the itemCopyFrom attribute of SOURCE is not NULL and points to CITEM, 713 is also answered with 'no'. In this case, the textbox of CITEM has been changed since the last execution of 515 and CITEM and SITEM are in fact the same object. In this case, there is also no need to execute a copy action. CITEM is marked as 'used' in step 706.

Decision Path 711-713-715-706

If the itemCopyFrom attribute of SOURCE is not NULL and points to another item object than CITEM, 713 is answered with 'yes'. This means, that the textbox of CITEM is outdated. In this case, step 715 is executed, wherein the textbox is copied from the item object SITEM being referenced by the itemCopyFrom attribute of SOURCE to CITEM. The item object SITEM is that very item object containing the user-introduced changes. SITEM does not have to be contained in the SOURCE agenda object, it can be contained in any other agenda object (the item object cannot be CITEM as in this case decision 713 would have been answered with 'no'). SITEM is characterized in that SOURCE points to SITEM via its itemCopyFrom attribute, the attribute being set after editing the textbox of SITEM by the user (see FIG. 6). After the execution of 715, CITEM is updated and marked as 'used' in step 706.

Decision Path 711-712:

In case the decision 711 is answered with 'no'—CONTAINER does not contain an item object CITEM with an agendaSource attribute pointing to SOURCE—a new item object CITEM is created 712 in the CONTAINER agenda object.

Decision Path 711-712-714-707-706:

In case the itemCopyFrom attribute of SOURCE is not valid (is NULL), the decision 714 is answered with 'no'. This means that no item object with agendaSource=SOURCE has been changed since the last execution of 515. The textbox is copied 707 from the itemOwn item object SITEM of SOURCE to the item object CITEM created in 712. Finally, CITEM is marked as 'used' in 706. This scenario holds true e.g. when the user has added a new agenda object NEWAGENDAOBJ to the document, the NEWAGENDAOBJ comprising a new item object NEWITEMOBJ referenced by the itemOwn attribute of NEWAGENDAOBJ. The SOURCE agenda object of the inner loop is the NEWAGENDAOBJ. As the addition of NEWAGENDAOBJ agenda object has not yet been propagated to other agenda objects, condition 711 cannot be fulfilled for NEWAGENDAOBJ and any item object of CONTAINER. Therefore, a new item object has to be created for CONTAINER obtaining its textbox by copying 707 the textbox from NEWITEMOBJ of SOURCE=NEWAGENDAOBJ.

Decision Path 711-712-714-715-706:

In case the ItemCopyFrom attribute of SOURCE is valid (714), this case differs from the last decision path in that the textbox for CITEM is not copied from the itemOwn item object of SOURCE but from the itemCopyFrom item object of SOURCE, which may be contained in another agenda object than SOURCE. This scenario applies if an item object SITEM pointing to SOURCE via its agendaSource attribute has been edited, the editing resulting in a valid itemCopyFrom attribute of SOURCE pointing to SITEM.

After completion of the inner loop for the CONTAINER object, at least one item object CITEM exists that is marked as 'used', which is the itemOwn item object. CITEM may have been created de novo, may have been taken over unchanged or may have been updated by copying its textbox from a recently edited item object.

Step 708 corresponds to a loop over all item objects of CONTAINER that are marked as 'used'. For each item object ITEM, the 'update formatting' method is called. The execution of this step is necessary, as the copying process of the textboxes in steps 715 or 707 may have resulted in a situation according to which the design information and formatting instructions of each item object no not fit any more to the position of the topic represented by an item object within the hierarchy of topics. In order to update the design of the textboxes of all item objects according to the topic hierarchy existing after the termination of the inner loop for a particular agenda object, the 'update formatting' method is executed on each item object of said particular agenda object, the CONTAINER.

The design of each topic box (item object) depends, according to preferred embodiments of the invention, on the position of a topic within a hierarchy of topics. By executing the 'update formatting' method, the design is updated according to the present state of the topic hierarchy.

On the contrary, the formatting of particular characters, e.g. setting characters in subscript or superscript, does not get lost as this formatting information is associated with the text boxes which are copied from SITEM to CITEM in the 'refresh agenda objects' method. An illustrative example of how a design is chosen for a topic and which designs are typically used is given in FIG. 9.

All other item objects of CONTAINER not being marked as 'used' are deleted in step 705 after completion of the outer loop. While the purpose of the two loops of FIG. 7 is to propagate changes introduced by the user to a textbox of any item object to all corresponding item objects of other agendas, the purpose of step 705 is to delete all item objects whose sourceAgenda agenda object is not longer present. The combination of the two loops and step 705 guarantees that all item objects and agenda objects within the electronic document are in a synchronized state.

After all agenda objects of the outer loop have been processed as described, the 'refresh agenda objects' method is completed 709 and all agenda objects and item objects are updated and synchronized.

Figure 8:
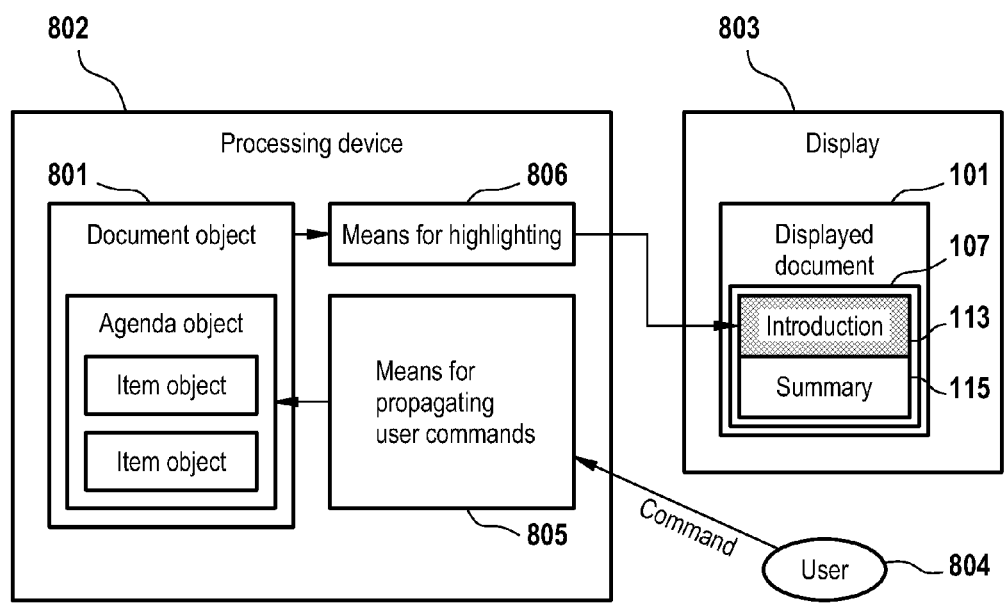
FIG. 8 is a block diagram of a computer system comprising means for efficient agenda drafting, synchronization and display.

FIG. 8 shows a computer system according to one embodiment of the invention. The computer system comprises a processing device 802, e.g. a computer or a mobile phone or any other processing device running a presentation or text processing software. The system also comprises means for displaying the visual document objects, e.g. a screen or a computer display. The system comprises also means for propagating user commands executed by the user on any of the visual document elements of the displayed document 101 via e.g. a keyboard, a multitouch interface or the like to the data objects of the document object 801. The propagation comprises the propagation of user commands 502-510, 516 as described in FIGS. 5 and 7. The means for highlighting according to the depicted embodiment of the invention comprise a software component being operable to highlight the content of current topic boxes of agendas, wherein a current topic box on the data object side corresponds to an item object being referenced via an itemOwn pointer of the agenda object the item object is contained in. This referencing results in the assignment of a particular design in the 'refresh agenda objects' method 515 to the textbox of the item object. The design assigned to topic boxes and current topic boxes may depend on criteria discussed in FIG. 9.

Figure 9:
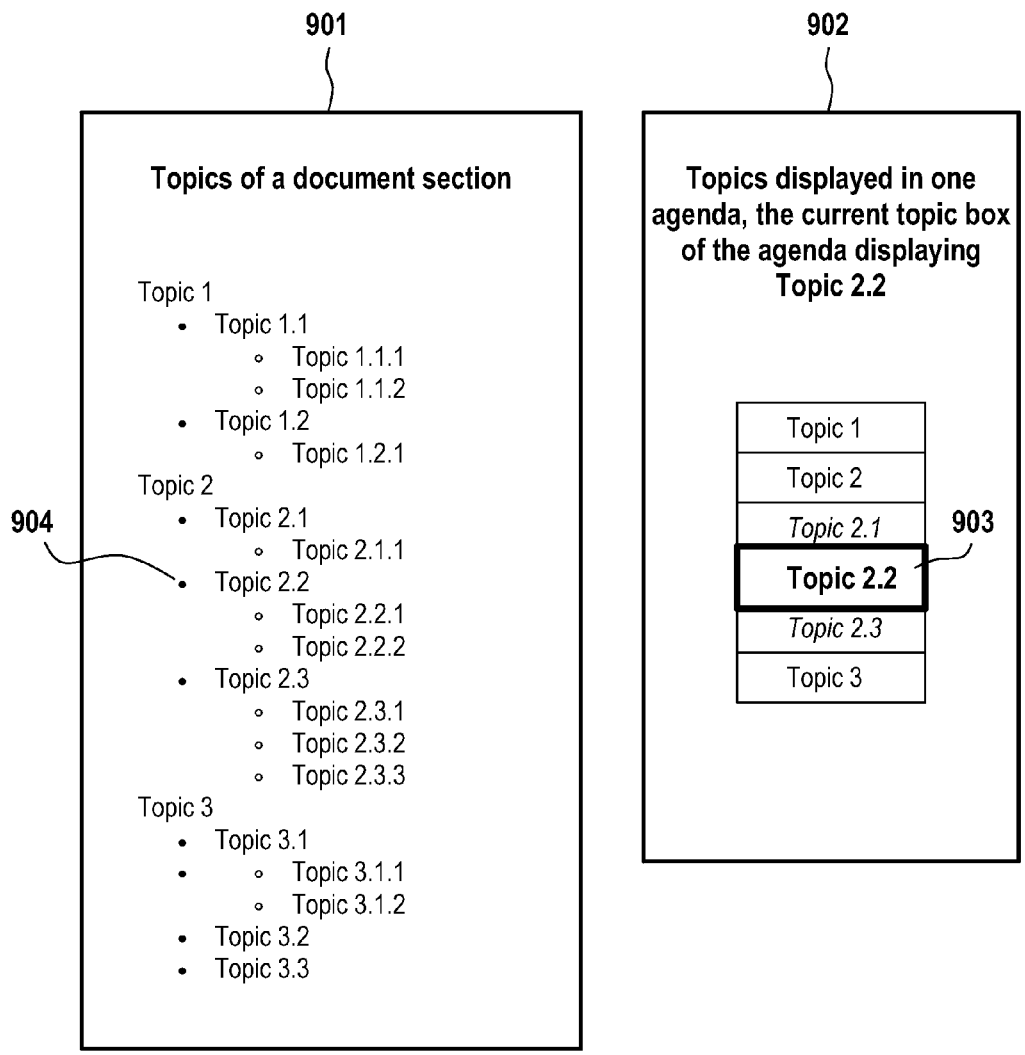
FIG. 9 is a comparison between the logical topic hierarchy of a document section and the view of an agenda displaying 'Topic 2.2' as current topic.

FIG. 9 shows a comparison between a logical hierarchy 901 of topics and the corresponding visual document elements in displayed document 902 according to a further embodiment of the invention. The topic 'Topic 2.2', for example, corresponds to the topic box 903 displaying the topic text of the current topic according to a particular design. The design that is applied to the topic texts can depend on a multitude of different factors and the combination of those factors, including, e.g., indentation level and the relation to the current topic of an agenda. For instance, a different design could be chosen depending on whether or not the topic in question is in the same branch of the topic hierarchy as the parent agenda's current topic. Also, a multitude of different aspects of topic text design can be used, including, e.g., bold text, italic text, text size, text color, background color, or frames with different line styles and line colors. Since it is also a valid formatting not to display a topic at all, it is possible to specify, e.g., that topics which are not on the top level of the hierarchy, and that are not under the same top level topic as the current topic, should not be displayed. The result of such a rule is illustrated by 902: topics that should not be displayed are formatted "invisible" and are not displayed in document 902.

According to further embodiments of the invention, the described behavior is achieved based on a different technical approach than the approach described beforehand. According to said further embodiments, item objects which shall not be displayed are not formatted as "invisible" but are deleted entirely.

Both types of embodiments have significant consequences on the refresh agendas algorithm and other implementational details. For clarity, in the remainder of this document, we assume that topics that should not be displayed are still represented by item objects, but are formatted as "invisible".

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

LIST OF REFERENCE NUMERALS 101 displayed document
102 page_1 of document 101
103 overview_1
104 topic 'Introduction'
105 topic 'Arguments'
106 topic 'Summary'
107 agenda_1
108 agenda_2
109 agenda_3
110 topic box
111 topic box
112 topic box
113 (current) topic box
114 topic box
115 topic box
116 topic box
117 (current) topic box
118 topic box
119 topic box
120 topic box
121 (current) topic box
201 user command 'create Arguments agenda'
202 user command 'insert topic box Arguments'
203 user command 'insert topic box Arguments'
204 user command 'insert topic box Arguments'
205 user command 'delete Summary agenda'
206 user command 'delete topic box Summary'
207 user command 'delete topic box Summary'
208 user command 'delete topic box Summary'
209 user command 'delete topic box Summary'
301 agenda object_1
302 agenda object_2
303 agenda object_4
304 agenda object attribute itemOwn
305 agenda object attribute itemCopyFrom
306 list of item objects
307 item object of agenda object_1 with text-box 'Introduction'
308 item object attribute agendaSource
309 item object attribute agendaContainer
310 item object of agenda object_1 with text-box 'Summary'
311 item object of agenda object_2 with text-box 'Introduction'
312 item object of agenda object_2 with text-box 'Summary'
313 item object of agenda object_4 with text-box 'Introduction'
314 item object of agenda object_4 with text-box 'Summary'
315 agendaContainer attribute of item object 310 pointing to agenda object_1
316 agendaSource attribute of item object 307 pointing to agenda object_2
317 itemOwn attribute of agenda object 302 pointing to item object 311
401 agenda object_3
402 item object of agenda object_1 with text-box 'Arguments'
403 item object of agenda object_2 with text-box 'Arguments'
404 item object of agenda object_3 with text-box 'Arguments'
405 item object of agenda object_4 with text-box 'Arguments'
406 item object of agenda object_3 with text-box 'Introduction'
407 item object of agenda object_3 with text-box 'Summary'
501 user
502 user command 'delete existing page/slide'
503 user command 'insert agenda'
504 user command 'insert overview'
505 user command 'insert topic box'
506 user command 'edit topic box'
507 user command 'delete topic box'
508 user command 'delete overview'
509 user command 'delete agenda'
510 user command 'reorder agenda(s)'
511 method 'create agenda object'
512 action of setting the itemCopyFrom attribute of an agenda object to point to an edited item object
513 method 'delete agenda object'
514 method: create item object being referenced via the itemOwn attribute of the agenda object created in 511
515 method 'refresh agenda object'
516 user command 'insert existing page/slide'
601 itemCopyFrom attribute of agenda object 303 pointing to edited item object 310
701 call of 'refresh agenda objects' method
702 entrance to outer loop
703 current agenda object CONTAINER of outer loop
704 entrance to inner loop
705 step
706 step
707 step
708 step 'update formatting'
709 end of 'refresh agenda objects' method
710 current agenda object SOURCE of inner loop
711 decision
712 step
713 decision
714 decision
715 step
801 document object
802 processing device
803 display
804 user
805 means for propagating user commands
806 means for highlighting 901 logical hierarchy of topics within a document section
902 topics displayed in one agenda
903 displayed topic 2.2
904 logical topic 2.2

The invention claimed is:

1. A method for efficient agenda drafting, the method comprising:
inserting, by a processor executing computer-readable instructions stored on a memory, a plurality of agendas in a substantive electronic presentation or text document, each of the plurality of agendas being inserted before a part of the substantive electronic presentation or text document that represents one of a plurality of topics, the plurality of agendas and the substantive electronic presentation or text document forming a single integrated electronic document, each of the plurality of agendas including a plurality of topic boxes each corresponding to and displaying one of the plurality of topics;
enabling at least one of an in-document editing and rearrangement of the plurality of topic boxes in one of the plurality of agendas;
automatically propagating any in-document edit made to or rearrangement of the plurality of topic boxes within any arbitrary one of the plurality of agendas on any arbitrary page of the substantive electronic presentation or text document to all other ones of the plurality of agendas; and
upon rearranging the plurality of topic boxes, automatically rearranging pages of the substantive electronic presentation or text document to correspond to the rearrangement of the plurality of topic boxes in the one of the plurality of agendas.

2. The method according to claim 1, wherein the in-document edits include at least one of:
adding a topic box to the plurality of topic boxes,
formatting content of one or more of the plurality of topic boxes,
deleting a topic box from among the plurality of topic boxes,
inserting a copy of a page in the single integrated electronic document corresponding to one of the plurality of agendas into a destination document, and
deleting a page in the single integrated electronic document corresponding to one of the plurality of agendas.

3. The method according to claim 1, wherein the in-document editing includes inserting a topic box between two of the plurality of topic boxes in one of the plurality of agendas.

4. The method according to claim 1, wherein
the rearrangement of the plurality of topic boxes includes moving a first one of the plurality of topic boxes to be placed before a second one the plurality of topic boxes, and
the automatically rearranging rearranges a first set of the pages of the substantive electronic presentation or text document that corresponds to a first topic associated with the first one of the plurality of topic boxes to be placed before a second set of pages of the substantive electronic presentation or text document that corresponds to a second topic associated with the second one of the plurality of topic boxes.

5. The method according to claim 1, further comprising:
rearranging pages of the substantive electronic presentation or text document such that a first set of the pages of the substantive electronic presentation or text document corresponding to a first one of the plurality of topics is placed before a second set of the pages of the substantive electronic presentation or text document corresponding to a second one of the plurality of topics; and
automatically rearranging an order of the plurality of topic boxes in the plurality of agendas based on the rearranged pages of the substantive electronic presentation or text document.

6. The method according to claim 1, further comprising:
adding a topic box to the plurality of topic boxes;
determining whether a number of the plurality of topic boxes exceeds a number of the plurality of agendas after the topic box is added to the plurality of topic boxes; and
if the determining determines that the number of the plurality of topic boxes exceeds the number of the plurality of agendas, adding an agenda to the plurality of agendas, the added agenda being inserted before an added topic in the substantive electronic presentation or text document, the added topic corresponding to the added topic box.

7. The method according to claim 1, further comprising:
highlighting a different one of the plurality of topic boxes in each of the plurality of agendas, the highlighted one of the plurality of topic boxes corresponding to one of the plurality of topics before which each of the plurality of agendas is inserted.

8. The method according to claim 1, wherein a design of each of the plurality of topic boxes on each of the plurality of agendas depends on a position of the corresponding one of the plurality of topics in a hierarchical structure of the plurality of topics.

9. The method according to claim 1, wherein the substantive electronic presentation or text document is one of,
a computer-implemented software program for creating a text having the plurality of topics, or
a computer-implemented software program for creating a plurality of slides having the plurality of topics.

10. A device comprising:
a memory having computer-readable instructions stored therein; and
a processor configured to execute the computer-readable instructions to,
insert a plurality of agendas in a substantive electronic presentation or text document, each of the plurality of agendas being inserted before a part of the substantive electronic presentation or text document that represents one of a plurality of topics, the plurality of agendas and the substantive electronic presentation or text document forming a single integrated electronic document, each of the plurality of agendas including a plurality of topic boxes each corresponding to and displaying one of the plurality of topics;
enable at least one of an in-document editing and rearrangement of the plurality of topic boxes in one of the plurality of agendas;
automatically propagate any in-document edit made to or rearrangement of the plurality of topic boxes within any arbitrary one of the plurality of agendas on any arbitrary page of the substantive electronic presentation or text document to all other ones of the plurality of agendas; and
upon rearranging the plurality of topic boxes, automatically rearrange pages of the substantive electronic presentation or text document to correspond to the rearrangement of the plurality of topic boxes in the one of the plurality of agendas.

11. The device according to claim 10, wherein the in-document edits include at least one of:
adding a topic box to the plurality of topic boxes,
formatting content of one or more of the plurality of topic boxes,
deleting a topic box from among the plurality of topic boxes,
inserting a copy of a page in the single integrated electronic document corresponding to one of the plurality of agendas into a destination document, and
deleting a page in the single integrated electronic document corresponding to one of the plurality of agendas.

12. The device according to claim 10, wherein the in-document editing includes inserting a topic box between two of the plurality of topic boxes in one of the plurality of agendas.

13. The device according to claim 10, wherein
the rearrangement of the plurality of topic boxes includes moving a first one of the plurality of topic boxes to be placed before a second one the plurality of topic boxes, and
the processor is configured to execute the computer-readable instructions to automatically rearrange a first set of the pages of the substantive electronic presentation or text document that corresponds to a first topic associated with the first one of the plurality of topic boxes to be placed before a second set of pages of the substantive electronic presentation or text document that corresponds to a second topic associated with the second one of the plurality of topic boxes.

14. The device according to claim 10, wherein the processor is further configured to execute the computer-readable instructions to,
rearrange pages of the substantive electronic presentation or text document such that a first set of the pages of the substantive electronic presentation or text document corresponding to a first one of the plurality of topics is placed before a second set of the pages of the substantive electronic presentation or text document corresponding to a second one of the plurality of topics; and
automatically rearrange an order of the plurality of topic boxes in the plurality of agendas based on the rearranged pages of the substantive electronic presentation or text document.

15. The device according to claim 10, wherein the processor is further configured to execute the computer-readable instructions to
add a topic box to the plurality of topic boxes;
determine whether a number of the plurality of topic boxes exceeds a number of the plurality of agendas after the topic box is added to the plurality of topic boxes; and
add an agenda to the plurality of agendas upon determining that the number of the plurality of topic boxes exceeds the number of the plurality of agendas, the added agenda being inserted before an added topic in the substantive electronic presentation or text document, the added topic corresponding to the added topic box.

16. The device according to claim 10, wherein the processor is further configured to execute the computer-readable instructions to highlight a different one of the plurality of topic boxes in each of the plurality of agendas, the highlighted one of the plurality of topic boxes corresponding to one of the plurality of topics before which each of the plurality of agendas is inserted.

17. The device according to claim 10, wherein a design of each of the plurality of topic boxes on each of the plurality of agendas depends on a position of the corresponding one of the plurality of topics in a hierarchical structure of the plurality of topics.

18. The device according to claim 10, wherein the substantive electronic presentation or text document is one of,
a computer-implemented software program for creating a text having the plurality of topics, or
a computer-implemented software program for creating a plurality of slides having the plurality of topics.

19. The device according to claim 10, wherein the device is at least one of,
a desktop computer,
a portable computer,
a tablet,
a mobile phone,
a server, and
a cloud infrastructure.

20. A non-transitory computer-readable medium comprising computer-readable instructions, which when executed by a processor, cause the processor to,
insert a plurality of agendas in a substantive electronic presentation or text document, each of the plurality of agendas being inserted before a part of the substantive electronic presentation or text document that represents one of a plurality of topics, the plurality of agendas and the substantive electronic presentation or text document forming a single integrated electronic document, each of the plurality of agendas including a plurality of topic boxes each corresponding to and displaying one of the plurality of topics;
enable at least one of an in-document editing and rearrangement of the plurality of topic boxes in one of the plurality of agendas;
automatically propagate any in-document edit made to or rearrangement of the plurality of topic boxes within any arbitrary one of the plurality of agendas on any arbitrary page of the substantive electronic presentation or text document to all other ones of the plurality of agendas; and
upon rearranging the plurality of topic boxes, automatically rearrange pages of the substantive electronic presentation or text document to correspond to the rearrangement of the plurality of topic boxes in the one of the plurality of agendas.

21. The non-transitory computer-readable medium according to claim 20, wherein the in-document edits include at least one of:
adding a topic box to the plurality of topic boxes,
formatting content of one or more of the plurality of topic boxes,
deleting a topic box from among the plurality of topic boxes,
inserting a copy of a page in the single integrated electronic document corresponding to one of the plurality of agendas into a destination document, and
deleting a page in the single integrated electronic document corresponding to one of the plurality of agendas.

22. The non-transitory computer-readable medium according to claim 20, wherein the in-document editing includes inserting a topic box between two of the plurality of topic boxes in one of the plurality of agendas.

23. The non-transitory computer-readable medium according to claim 20, wherein the rearrangement of the plurality of topic boxes includes moving a first one of the plurality of topic boxes to be placed before a second one the plurality of topic boxes, and the execution of the computer-readable instructions by the processor further cause the processor to automatically rearrange a first set of the pages of the substantive electronic presentation or text document that corresponds to a first topic associated with the first one of the plurality of topic boxes to be placed before a second set of pages of the substantive electronic presentation or text document that corresponds to a second topic associated with the second one of the plurality of topic boxes.

24. The non-transitory computer-readable medium according to claim 20, wherein the execution of the computer-readable instructions by the processor further cause the processor to, rearrange pages of the substantive electronic presentation or text document such that a first set of the pages of the substantive electronic presentation or text document corresponding to a first one of the plurality of topics is placed before a second set of the pages of the substantive electronic presentation or text document corresponding to a second one of the plurality of topics; and automatically rearrange an order of the plurality of topic boxes in the plurality of agendas based on the rearranged pages of the substantive electronic presentation or text document.

25. The non-transitory computer-readable medium according to claim 20, wherein the execution of the computer-readable instructions by the processor further cause the processor to, add a topic box to the plurality of topic boxes;

determine whether a number of the plurality of topic boxes exceeds a number of the plurality of agendas after the topic box is added to the plurality of topic boxes; and add an agenda to the plurality of agendas upon determining that the number of the plurality of topic boxes exceeds the number of the plurality of agendas, the added agenda being inserted before an added topic in the substantive electronic presentation or text document, the added topic corresponding to the added topic box.

26. The non-transitory computer-readable medium according to claim 20, wherein the execution of the computer-readable instructions by the processor further cause the processor to highlight a different one of the plurality of topic boxes in each of the plurality of agendas, the highlighted one of the plurality of topic boxes corresponding to one of the plurality of topics before which each of the plurality of agendas is inserted.

27. The non-transitory computer-readable medium according to claim 20, wherein a design of each of the plurality of topic boxes on each of the plurality of agendas depends on a position of the corresponding one of the plurality of topics in a hierarchical structure of the plurality of topics.

28. The non-transitory computer-readable medium according to claim 20, wherein the substantive electronic presentation or text document is one of, a computer-implemented software program for creating a text having the plurality of topics, or a computer-implemented software program for creating a plurality of slides having the plurality of topics.

29. The non-transitory computer-readable medium according to claim 20, wherein the processor is configured to be operable on at least one of, a desktop computer,
a portable computer,
a tablet,
a mobile phone,
a server, and
a cloud infrastructure.

30. A method for efficient agenda drafting, the method comprising:

inserting, by a processor executing computer-readable instructions stored on a memory, a plurality of agendas in a substantive electronic presentation or text document, each of the plurality of agendas being inserted before a part of the substantive electronic presentation or text document that represents one of a plurality of topics, the plurality of agendas and the substantive electronic presentation or text document forming a single integrated electronic document, each of the plurality of agendas including a plurality of topic boxes each corresponding to and displaying one of the plurality of topics;

enabling a rearrangement of pages of the substantive electronic presentation or text document; and upon rearranging the pages of the substantive electronic presentation or text document, automatically rearranging an order of the plurality of topic boxes in the plurality of agendas based on the rearranged pages of the substantive electronic presentation or text document.

31. The method according to claim 30, the method comprising:

enabling at least one of an in-document editing and rearrangement of the plurality of topic boxes in one of the plurality of agendas; and automatically propagating any in-document edit made to or rearrangement of the plurality of topic boxes within any arbitrary one of the plurality of agendas on any arbitrary page of the substantive electronic presentation or text document to all other ones of the plurality of agendas.

32. The method according to claim 31, wherein the in-document edits include at least one of:

adding a topic box to the plurality of topic boxes,
formatting content of one or more of the plurality of topic boxes,
deleting a topic box from among the plurality of topic boxes,
inserting a copy of a page in the single integrated electronic document corresponding to one of the plurality of agendas into a destination document, and
deleting a page in the single integrated electronic document corresponding to one of the plurality of agendas.

* * * * *